(12) United States Patent
Kaag et al.

(10) Patent No.: US 10,419,114 B2
(45) Date of Patent: Sep. 17, 2019

(54) SYSTEM AND METHOD FOR TARGETED DATA COMMUNICATION

(71) Applicant: SIGNIFY HOLDING B.V., Eindhoven (NL)

(72) Inventors: Bjorn Christiaan Wouter Kaag, Heerlen (NL); Mark Thomas Johnson, Arendonk (BE); Frederik Jan De Bruijn, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/778,514

(22) PCT Filed: Nov. 16, 2016

(86) PCT No.: PCT/EP2016/077868
§ 371 (c)(1),
(2) Date: May 23, 2018

(87) PCT Pub. No.: WO2017/089199
PCT Pub. Date: Jun. 1, 2017

(65) Prior Publication Data
US 2018/0351643 A1 Dec. 6, 2018

(30) Foreign Application Priority Data
Nov. 26, 2015 (EP) ..................... 15196399

(51) Int. Cl.
*H04B 10/114* (2013.01)
*H04B 10/116* (2013.01)
(Continued)

(52) U.S. Cl.
CPC ....... *H04B 10/1149* (2013.01); *H04B 10/116* (2013.01); *H04W 28/26* (2013.01); *H04W 40/20* (2013.01)

(58) Field of Classification Search
CPC . H04B 10/1149; H04B 10/116; H04W 28/26; H04W 40/20
(Continued)

(56) References Cited

U.S. PATENT DOCUMENTS 9,418,115 B2 * 8/2016 Ganick ............ H04B 10/1149
2008/0281515 A1 11/2008 Ann et al.
(Continued)

OTHER PUBLICATIONS

Frank Duvnjak et al., "Heterogeneous Wi-Fi and VLC (RF-Optical) Wireless Access Architecture," 2015 23rd International Conference on Software, Telecommunications and Computer Networks (Softcom), University of Split, 2015 (5 Pages).

*Primary Examiner* — Dalzid E Singh
(74) *Attorney, Agent, or Firm* — Meenakshy Chakravorty

(57) ABSTRACT

The invention relates to a method for directing communication traffic to and from a communication unit within an application control system, wherein the application control system comprises a plurality of application control components and the application control components are capable of transmitting messages to the communication unit using light waves. By determining position information of the application control components within the application control system and of a first communication unit within the application control system, an area of interest for the first communication unit is computed based on at least the first position information. A first subgroup of one or more application control components from the plurality of application control components located within the area of interest of the first communication unit is identified and data paths through the application control system are programmed to communicate with the communication unit using the identified subgroup of application control components.

13 Claims, 12 Drawing Sheets

(51) Int. Cl.
*H04W 28/26* (2009.01)
*H04W 40/20* (2009.01)

(58) Field of Classification Search
USPC .......................................... 398/127
See application file for complete search history.

(56) References Cited

U.S. PATENT DOCUMENTS

| | | | |
|---|---|---|---|
| 2009/0157309 A1* | 6/2009 | Won | G01C 21/20 |
| | | | 701/533 |
| 2011/0010090 A1 | 1/2011 | Bae et al. | |
| 2012/0310703 A1 | 12/2012 | Cavacanti et al. | |
| 2014/0050487 A1* | 2/2014 | Liu | H04B 10/1125 |
| | | | 398/127 |

* cited by examiner

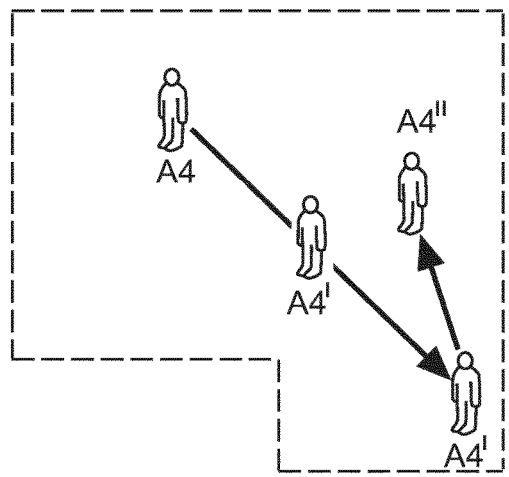
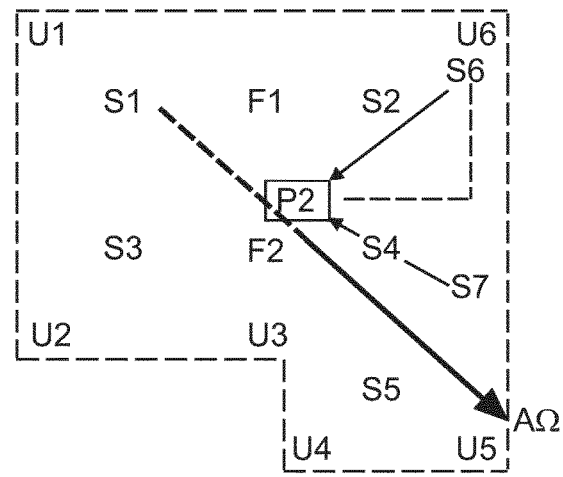
FIG. 5a      FIG. 5b
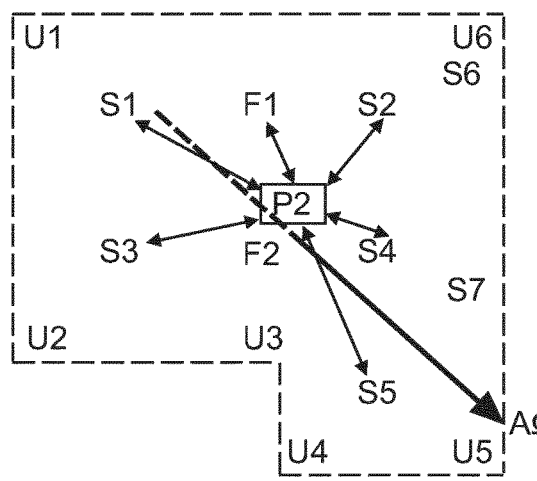
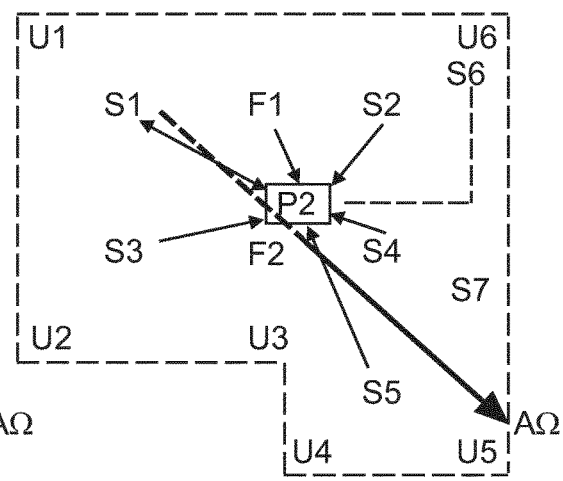
FIG. 5c      FIG. 5d

SYSTEM AND METHOD FOR TARGETED DATA COMMUNICATION

CROSS-REFERENCE TO PRIOR APPLICATIONS

This application is the U.S. National Phase application under 35 U.S.C. § 371 of International Application No. PCT/EP2016/077868, filed on Nov. 16, 2016, which claims the benefit of European Patent Application No. 15196399.8, filed on Nov. 26, 2015. These applications are hereby incorporated by reference herein.

FIELD OF THE INVENTION

The present invention relates to the field of data communication within an application control system, in particular—but not limited to—Visible Light Communication in lighting control applications. More particular the invention relates to managing and directing communication traffic within an application control system, e.g. targeting data transmissions, embedded in light waves, to selected light emitters.

BACKGROUND OF THE INVENTION

In wired communication systems, like for example wired Ethernet, data is provided to an end node via the data path given by a cable connecting the end node's network interface and a data forwarding device on the communication network. In state of the art wireless communication systems, RF signals are used for data communication between an end node and data forwarding device on the communication network. Although RF signals can be transmitted through walls, a sufficient number of wireless RF access points is required to guarantee that a user will obtain a proper connection to the communication network. However, a dense distribution of RF transceivers will occupy bandwidth in the spectrum, effectively limiting bandwidth available to each connected end node.

A new type of communication networks is emerging, where the communication is performed by light waves. Light sources may be used to transmit data to a receiver. The light waves may be visible or invisible to the human eye. A major difference to RF signalling is that light signals are line-of-sight-connections that will be obstructed by obstacles such as walls. A light source may be a luminaire normally used for illumination lighting of a space in a building, e.g. a luminaire that produces artificial light to illuminate the surrounding area. A system using such light sources for data communication is also known as a Visible Light Communication (i.e. VLC) system. Since a VLC system's main objective is high quality illumination lighting, the data transmit rates are limited by requirements imposed by their primary function. Light sources primarily used for illumination lighting are therefore generally slower data transmission devices. In order to achieve higher transmission data rates data transmission light sources that are not primarily tailored at illumination lighting may be used alternatively or in addition. Examples are for instance—but not limited to—emitters using changes in light levels (on, off, dimming, colours), using multiple colours simultaneously (e.g. RGBW), a laser source or IR or UV sources. These latter examples work best with a specific receiver, such as for example an optimized photo detector.

From US 2009157309 A1 a navigation system using messages in a visible light communication system is known. After having received a broadcast message via all lights installed in a building offering the navigation service, the user may subscribe to the service. The user may submit a desired destination to a central navigation map server. In return, the navigation map server provides a map including direction information via the light(s) identified in the vicinity of the user.

The article "Heterogeneous WI-FI and VLC (RF-optical) wireless architecture" by F. Duvnjak et al., 23rd International Conference on Software. Telecommunications and Computer Networks (SOFTCOM), University of Split, pages 310-314, 16 Sep. 2015 discloses a visible light communication system in which resource allocation is optimised by position information of the user devise obtained from optical light sources. In application control systems, such as for instance a lighting control system in a building, actuators (i.e. the lights) are typically installed at rather short distances, e.g. every few meters. When those actuators are used to emit data signals using light, a very dense network of emitters is established within a particular area. In state of the art optical communication systems, it is a challenge to properly deliver data to the receiving end node, especially when the end node is mobile and in transit (i.e. a person carrying a mobile receiver device). The main problem with such systems is that when the system does not know where the mobile receiver device is located at present, it may inject its data using all emitters, in the hope that the receiver device will pick it up. Such an approach limits the effective bandwidth within the network and does not scale well with a larger number of mobile end-nodes serviced within the same optical communication system.

SUMMARY OF THE INVENTION

It is an object of the present invention to provide a method and system that improve data communication within an optical communication system, in particular the present invention is dedicated to improve the resource management for data communication in application control networks.

In an aspect of the present invention there is provided a method for directing communication traffic to and from a communication unit within an application control system, wherein the application control system comprises a plurality of application control components and the application control components being capable of transmitting data to the communication unit using light waves. The method comprises the steps of:

determining the positions of the application control components within the application control system;

determining respective first and second position information of a first communication unit within the application control system at subsequent instants;

computing an area of interest for the first communication unit based on changes between at least the first and second position information;

identifying a first subgroup of one or more application control components from the plurality of application control components located within the area of interest of the first communication unit; and programming data paths through the application control system to communicate data with the communication unit using the identified subgroup of application control components.

By determining a position of a communication unit, which may receive and/or transmit data from/to the application control network underlying the application control system, it is possible to select a subgroup of one or more specific application control components capable of data communication which are located in the vicinity of the communication unit for data transmission. In particular, when data is to be transmitted from the application control system to the communication unit, knowledge about the location of the communication unit enables distinct selection of one or more data emitters among the application control components in the vicinity of the receiving communication unit. The remaining application control components may be disregarded for the data emission to that particular communication unit such that their capacity can be used for other data communication or application tasks. The data transmission capacity of an application control component may be limited, especially if the primary task of the application control component is to serve the application control system, e.g. lights used in a lighting control system whose primary purpose is to provide illumination light and which additionally may be used for data transmission. Hence, by observing the position of a receiving communication unit, dynamically determining its location within the network to distinctly inject the data for said receiving communication unit by selecting at least one suitable emitter and automatically programming the data paths to said emitter provides an efficient resource management and effective usage of the available bandwidth. This becomes especially important for dense networks and/or a plurality of communication units or otherwise increased data transmission volumes. The determination of the position of the communication unit may be based on information provided by external sensors that detect the position or may be based on absolute or relative position information provided by the communication unit itself.

Communication using light waves may make use of modulation techniques to embed data into light, for example, data may be embedded in illumination light using modulation techniques as proposed in the IEEE 802.15.7 standard such as on-off keying (OOK), colour shift keying (CSK), or variable pulse position modulation (VPPM). Alternatively other known visible light communication technologies may be used that are compatible with illumination light and that do not result in perceptible flicker to the human eye. More alternatively communication using light waves may involve the use of Infrared Data Association (IrDA) standards, or other free space optical communication modulation techniques that make use of dedicated transmitters (i.e. transmitters not having an illumination function). Generally speaking communication using light waves may make use of a wide range of modulation techniques ranging from simple techniques employing amplitude, phase or frequency modulation up to more complex modulation schemes employing CDMA, or optical orthogonal frequency multiplexing (O-OFDM).

By determining the most likely trajectory of a communication unit within a network to predict its current and next position, the effective selection of suitable emitters/receivers to transmit/receive data to/from said moving communication unit can be enhanced. Furthermore, handover between emitters along the trajectory may be smoothly prepared to ensure proper data delivery.

In an embodiment of the present invention the plurality of application control components comprise a first application control component and a second application control component having different characteristics, in particular, but not limited to, any one or more of maximum bit rate, throughput, transmission delay, availability, latency, error rates, and support for prioritization. Programming data paths through the application control system to communicate data with the first communication unit using the identified subgroup of application control components takes into account a pre-determined preference when selecting at least one of the first application control component and the second application control component if both are located within the determined area of interest.

Within an application control system there may be application control components whose primary purpose is to fulfil their functionality within the application control system; for example, within a lighting control system the main purpose of a light may be to provide illumination light. However, in addition the light may be used for data transmission. Usually, the capacity for data transmission of light sources primarily dedicated to illumination purposes is rather limited and thus such a light is usually considered a slow emitter. There may be other application control components providing higher data rates for data communication, e.g. emitters which are not used for illumination lighting but that allow to change light levels for data communication, such as colour, on, off, dimming etc. These application control components enable faster data communication. Thus by selecting fast over slow emitters the overall data communication may be improved.

Although throughput speed generally is considered relevant for data communication, it may be preferable to opt for a lower speed link, even though a high speed link is available. The latter e.g. would be preferable when it is preferred to minimize the need for switching over to different reception schemes (as would be incurred when moving from a fast to a slow transmitter).

In addition to speed it is further noted that apart from speed there may be other characteristics that might be preferable; and therefore subject of a pre-determined preference. Such characteristics may include, but are not limited to, the bit rate, throughput, transmission delay, (continuous) availability, message latency, availability of traffic classes and/or prioritization.

In an embodiment of the present invention programming data paths through the application control system to communicate data with the first communication unit using the identified subgroup of application control components comprises temporarily assigning a light channel to the first communication unit. The light channel may be any construct that allows distinct transfer of data transmissions embedded in light signals to one or more receiving unit, e.g. a light channel of a unique frequency, a specific intensity level, etc. A lighting fixture may have one or more light sources. In case of two and more light sources each light source may be assigned to a respective light channel or all light sources may be assigned to a single light channel. Any intermediate assignment of N light sources to a light channel may also be realized. A light source may also be assigned to more than one light channel. Furthermore, a light channel may be configured to transmit multiplexed data to a plurality of receivers. The light channel configuration may be provided to an application control component together or in addition to a data path configuration by a management unit that is acquainted with the configuration possibilities of the application control components within the application control system. After an application control components has received and implemented a particular light channel configuration assigning a specific light channel to a particular communication unit, data received via the programmed data path that is addressed to the communication unit will be communicated via the configured light channel, e.g. a red LED within a lighting fixture. The management unit may also coordinate light channel usage in case more than one communication units are present within a particular area. For instance, in case a second communication unit is present in close vicinity to the first communication unit, the same application control component may be selected as data injector. Accordingly, a second data path is programmed through the network and the application control unit may be configured to use another light channel for data communication with the second communication unit, e.g. a green LED within the same lighting fixture. Thus, interference may be avoided. By assigning light channels to respective communication units in a dynamic manner, the system may account for position changes and or occupancy levels of communication units with a particular area covered by the application control system. If desired, data addressed to different communication units may also be multiplexed on a single (or multiple) light channel(s) applying suitable multiplexing techniques (e.g. ODFM, etc). An exemplary implementation for efficiently assigning light channels to respective communication end nodes may use a channel map stored on an application control component linking a logical identifiers (e.g. a logical channel number) to respective communication units and a predefined channel configuration. In an embodiment of the present invention the method further comprises determining the availability of the plurality of application control components in accordance with an application plan. Further, identifying a first subgroup of one or more application control components from the plurality of application control components located within the area of interest of the first communication unit is restricted to the plurality of application control components available at a respective instant of time in accordance with the application plan. An application plan provides an application specific context to the respective application control components within an application control system. Based on usage patterns, which may be defined or learned during operation by self-learning mechanisms, an application plan may define one or more application scenes which may define particular modes of operation for a variety of application control components as well as their interactions. As a simple example, there may be different application scenes for day and night scenarios of a lighting control system for respective rooms of a building. Wherein at night only a minimal set of lights may be activated by a corresponding presence detector, the same presence detector may trigger full illumination using all lights present in a room during day time. Hence, the application plan provides context based on usage patterns to the control mechanisms applied in an application control system, thus allowing system optimisations, for instance with respect to energy savings. Application control components that will not be required for a known period of time, may be switched to a power saving mode in accordance with the application scenes defined by the application plan. The context provided by the application plan may also be used to determine a suitable application control component for data transmission, either with respect to the availability of the application control component as such, e.g. determination whether component is on/off, but also with respect to its availability for data communication, e.g. the application control component might be extensively used for other application purposes.

In an embodiment of the present invention the method further comprises:
determining third position information of a second communication unit within the application control system at a first instant; and
compute an area of interest for the second communication unit based on at least the third position information;
identify a second subgroup of one or more application control components from the plurality of application control components located within the area of interest of the second communication unit; and
wherein programming data paths through the application control system to communicate data with the first and second communication unit using the identified subgroups of application control components comprises:
(i) multiplexing data transmissions for the first and second communication unit if the first and second subgroups of application control components overlap, or
(ii) program data paths through the application control system to communicate data with the first and second communication unit using mutually exclusive application control components.

By combining present and future position information of two or more stationary or moving communication units, the available resources for data transmissions to and from the two or more devices may be distributed in the most effective manner. In one scenario it may be most efficient to share one and the same resource, e.g. application control unit, and multiplex the data transmissions to be send to both receiving units simultaneously. This scenario may be most efficient for the transfer of respective small sized or timely uncritical data transmissions, especially when other resources may be set or remain in a power saving mode. In other cases it may be more efficient to select interleaving, mutually exclusive application control components to serve different communication units. For instance in chase two mobile units are carried along the same path through a building and constantly receive data transmissions from an application control network, it may be advantageous to select mutually interleaving emitters for data transmissions to the respective communication units.

In another aspect of the present invention there is provided a computer program executable in a processing unit, the computer program comprising program code means for causing the processing unit to carry out a method as defined in the previous aspect of the invention, when the computer program is executed in the processing unit.

In another aspect of the present invention there is provided a control system for directing communication traffic to and from a communication unit within an application control system, wherein the application control system comprises a plurality of application control components, the application control components being capable of transmitting data to the communication unit, comprising:
a first interface for receiving position information of each of the plurality of application control components within the application control system;
a processing unit configured to:
determine respective first and second position information of a first communication unit within the application control system at subsequent instants;
compute an area of interest for the first communication unit based on changes between at least the first and second position information;
identify a first subgroup of application control components from the plurality of application control components located within the area of interest of the first communication unit; and
an interface for programming data paths through the application control system to communicate data with the communication unit using the identified subgroup of application control components.

In an embodiment of the present invention the plurality of application control components comprise a first application control component and a second application control component having different characteristics, in particular, but not limited to, any one or more of maximum bit rate, throughput, transmission delay, availability, latency, error rates, and support for prioritization, and wherein the processing unit is further adapted to program data paths through the application control system to communicate data with the first communication unit using the identified subgroup of application control components by taking into account a predetermined preference when selecting at least one of the first application control component and the second application control component if both are located within the determined area of interest.

In an embodiment of the present invention the control system further comprises an application plan defining application scenes for the second application control component and wherein the processing unit is further adapted to program data paths through the application control system to communicate data based on the availability of the second application control components according to the respective application scenes.

In an embodiment of the present invention the processing unit is further adapted to compute data paths through the application control system to communicate data with the first communication unit using the identified subgroup of application control components by temporarily assigning a dynamic light channel to the first communication unit.

In an embodiment of the present invention the control system further comprises an application plan, wherein the processing unit is further configured to identify a first subgroup of one or more application control components from the plurality of application control components located within the area of interest of the first communication unit from the plurality of application control components available at a respective instant of time in accordance with the application plan.

In an embodiment of the present invention the processing unit is further adapted to determine third position information of a second communication unit within the application control system at a first instant; compute an area of interest for the second communication unit based on at least the third position information and identify a second subgroup of application control components from the plurality of application control components located within the area of interest of the second communication unit. The processing unit is further configured to program data paths through the application control system to communicate data with the first and second communication unit using the identified subgroups of application control components by (i) multiplexing data transmissions for the first and second communication unit if the first and second subgroups of application control components overlap, or (ii) programming data paths through the application control system to communicate data with the first and second communication unit using mutually exclusive application control components.

It shall be understood that the method for directing communication traffic to and from a communication unit within an application control system of claim 1, the computer program of claim 8 and the control system of claim 9 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIGS. 5a-d show position computation of a mobile receiver A4 at time t=2 as shown in FIG. 3.

DETAILED DESCRIPTION OF EMBODIMENTS

Some embodiments are exemplary described in the context of lighting control applications as preferred embodiments. However, it is to be understood that the embodiments are not restricted to lighting control applications. The person skilled in the art will appreciate that the methods and devices may be exploited for any other control application requiring a similar system topology.

In the following a software defined application (SDA) system provides knowledge about application specific requirements and instructions as stipulated in an application plan comprising one or more application scenes. For instance, an example of an SDA system is a software defined lighting (SDL) system that defines a lighting plan comprising one or more lighting scenes. A lighting scene may for example define dependencies or interactions between application control components, e.g. which lamps are to be switched on if a particular sensor is triggered. The lighting scenes may be defined for specific timeslots, such a day or night, weekdays, weekends, and so on.

A network management system such as a software defined networking (SDN) system provides knowledge about the respective network components present in a mesh network and may control configuration of forwarding tables and the like. However, the network management system does not know about application specific connections between certain network components.

Together the SDA system and the SDN system constitute a software defined control (SDC) system which combines both layers (application and network). The SDC system maps the application/lighting components onto the network topology and thus has the knowledge to decide which components or component parts may be switched off without degrading the capability of the (lighting) control network to execute a (lighting) application. Both modules, the SDN and SDA system may be implemented as program code means of a computer program; which can be executed on a processing unit, such as but not limited to one or more computers having a central processing unit for accessing and executing the program code stored in internal or external memory. When flexibility is desired; the SDN and SDA may be implemented as program code; however it will be clear to those skilled in the art that similar functionality may be fully or partially realized through the use of dedicated logic, in the form of an Application Specific Integrated Circuit(s), or could make use of programmable hardware in the form of (Field) Programmable Gate Array(s) or combinations of both software/hardware implementations. The processing unit may provide a user interface, e.g. a display and input means. The processing unit may be located on-site the application control system or be located remotely from the application control system.

Figure 1:
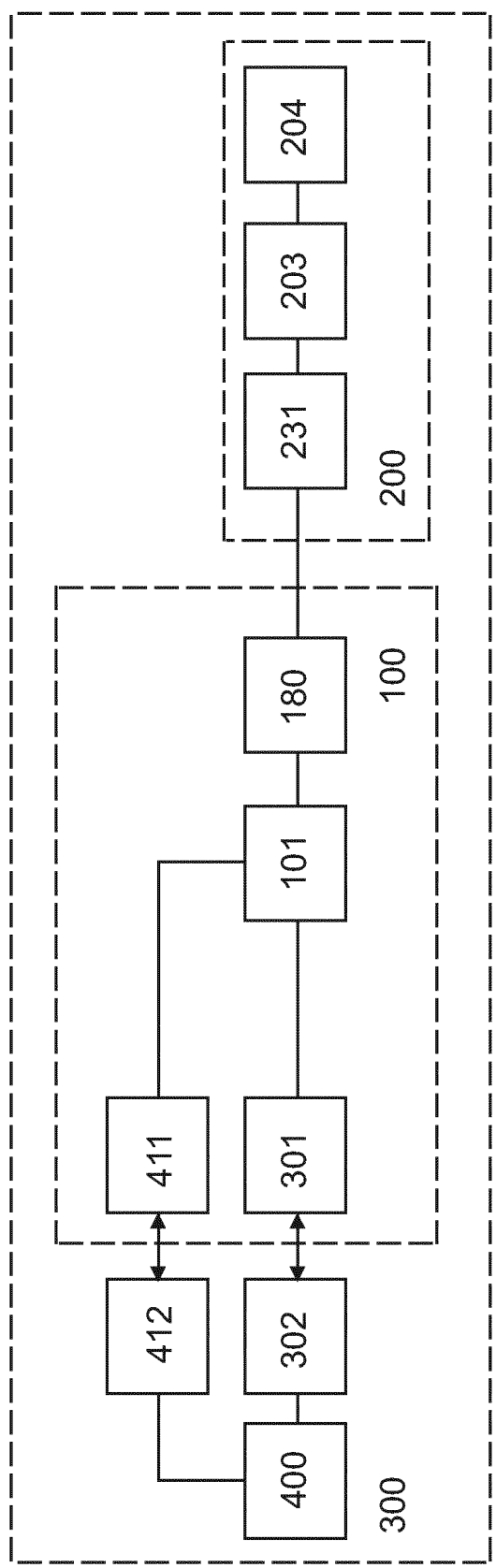
FIG. 1 shows a domain model of a lighting control system in accordance with a preferred embodiment.

FIG. 1 illustrates a domain model of a lighting control system 300 as a preferred embodiment of the present invention. A (Software Defined) Control System 200, subject to its application plan 204 and the application scenes stipulated therein can consult a network management system 231 and the software defined application system 203 may dynamically configure communication paths 180 through a communication network 100 to a lighting control component 301 that is deemed suitable to emit data embedded in light waves to a detector 302 comprised in or at least communicatively coupled to a data communication end node 400. The data communication will be described in the following for the direction in which data messages are transmitted from the communication network 100, via data emitters 301, to a data communication end node 400 as receiving unit, which may be stationary or moving e.g. being carried around by persons or roving apparatus within the building. However, the person skilled in the art will appreciate that data communication from a (mobile) communication end node 400 to the communication network 100 is also possible by simply exchanging the emitter and receiver functionality. Hence, instead of having a light detector/receiver unit 302 at the data communication end node 400 to receive data messages embedded in light waves, the data communication end node 400 may have alternatively or additionally a light emitter unit 302 to emit light waves carrying embedded data transmissions. Likewise, at the network side, light detectors 301 may be provided to receive light transmission from the data communication end node 400 carrying embedded data communication.

Optionally, a hybrid system may be implemented by establishing a further RF transceiver 411 establishing a further link between the data communication end node 400 and a network component 101 within communication network 100 in addition, to transmit messages, in particular for communication from the data communication end node to the communication network. The data communication between the network components 101 and the application control components or RF transceiver 411 may be wireless or wired, with or without additional power provision, e.g. power over Ethernet.

Figure 2:
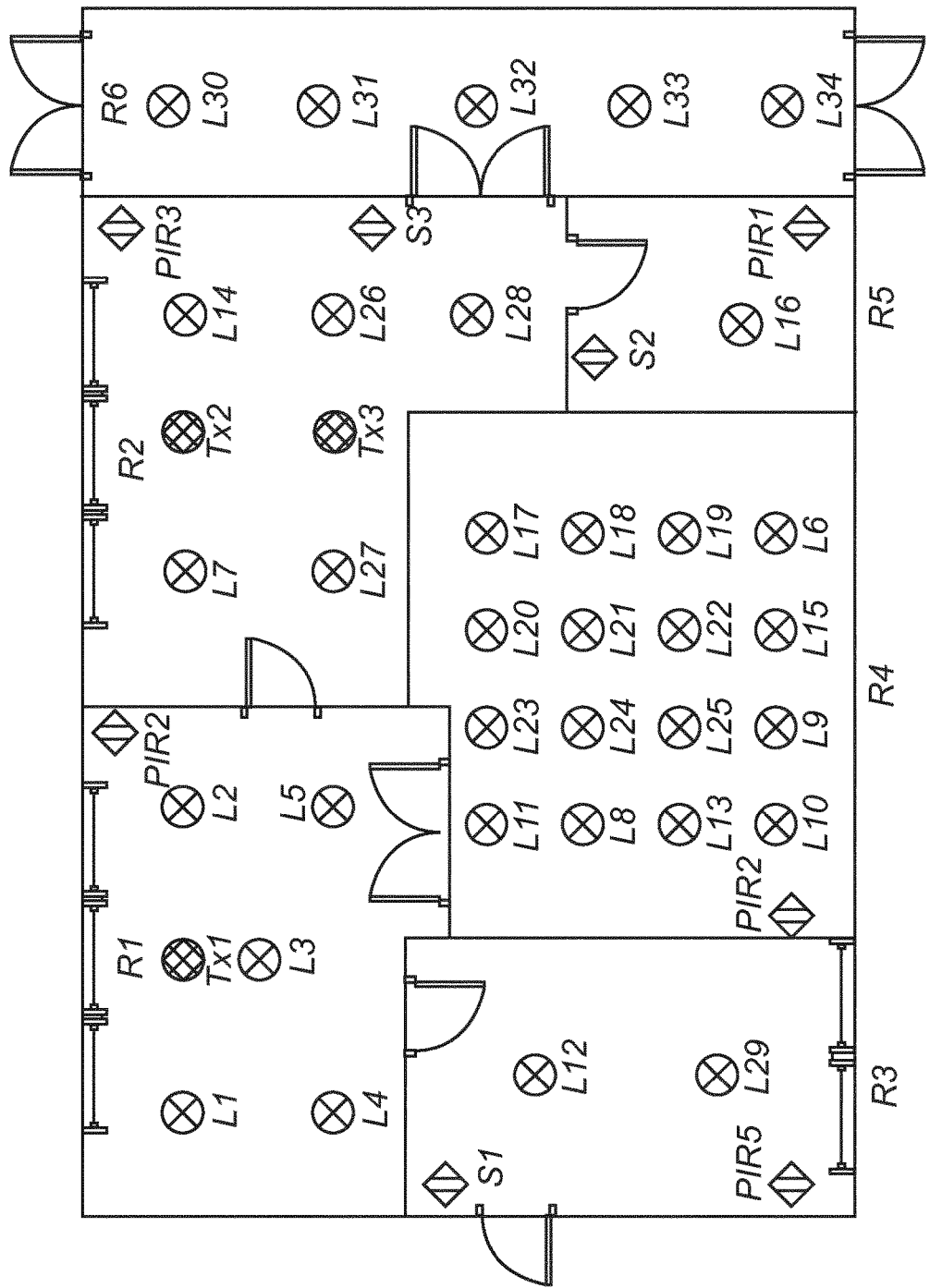
FIG. 2 shows an exemplary building plan with a plurality of lighting control components.

FIG. 2 introduces an exemplary building plan with rooms R1-R6 presenting a (hybrid) communication system with a plurality of lighting control components L1-L34 as well as Tx1-Tx3, e.g. light emitters capable of embedding data imperceptibly in the light of the system (i.e. visible light communications or VLC), or otherwise using visible or invisible light emissions such as for example but not limited to laser, IR or UV light (i.e. Free Space Optics or FSO). Furthermore, there are infrared presence detectors PIR1 to PIR5 and sensors WS1-WS3 which may be used to trigger light emission upon detection of a person entering the rooms. There may be a single or a plurality of lighting control components inside one space of a building. Especially the lighting control components which primarily serve as illumination lighting devices L1-L34 may be switched on or off depending on the actual need for illumination light. The presented system will dynamically adapt operation to use the available lighting control components for data communication as effectively as possible. Light emitters whose primary task is to provide illumination lighting are referred to as slow emitters L1-L34, wherein light emitters dedicated to data transmission are referred to as fast emitters Tx1-Tx3.

Figure 3:
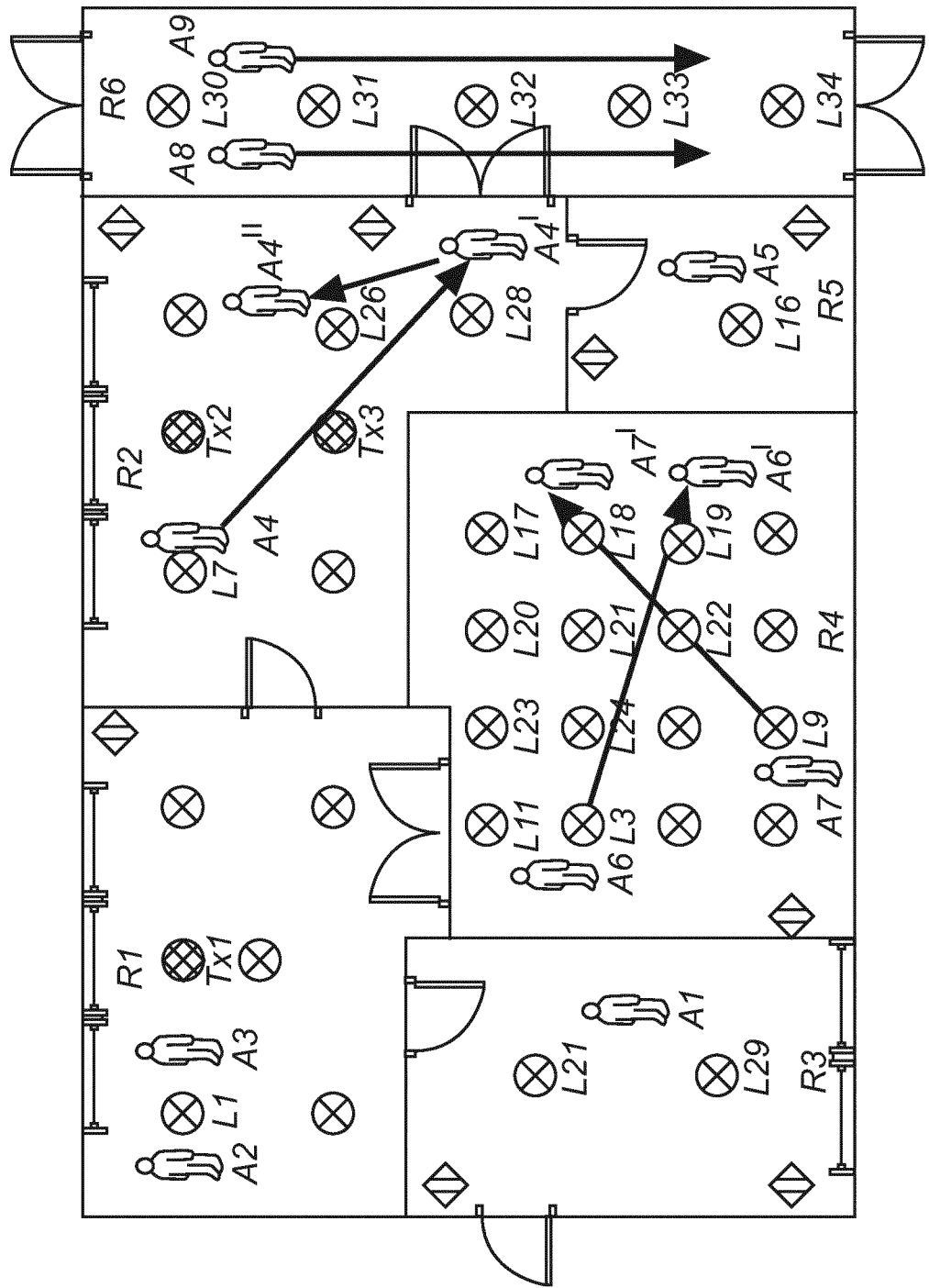
FIG. 3 shows example use cases of preferred embodiments of the present invention for the building plan of FIG. 2.

FIG. 3 shows the same exemplary building plan, now occupied by persons which each carry a mobile data communication end node 400, in the following referred to as mobile receivers A1-A9. The following scenarios are shown:

| Use cases | Description | Refer to |
|---|---|---|
| 1 | One receiver in one space with one emitter. | Room R5 |
| 2 | One receiver in one space with multiple emitters. | Room R3 |
| 3 | Multiple receivers in same space with multiple emitters. | Room R1 |
| 4 | One receiver moving in one space with multiple emitters. | Room R2 |
| 5 | Multiple mobile receivers crossing paths in one space. | Room R4 |
| 6 | Multiple mobile receivers moving in same direction in one space. | Room R6 |

In order to determine suitable emitters for data transmission to the respective mobile receivers given by the 6 example use cases, certain input is required regarding the components involved in data communication.

As a basis, the management system supporting the application control, e.g. a software defined application system, needs to know the relative positions of the emitters present in a particular area to be able to compare that with the current position of a respective receiver. Based on this input the system may be enabled to determine suitable emitters that can be used for data transmission and assist, for instance a software defined control system, in dynamically program paths through the network that interconnect said suitable emitters to a control system as will be described in detail for the respective use cases with reference to FIGS. 5-11.

The stationary use cases 1-3 each comprise a single or multiple stationary receivers within an area equipped with either a single or a plurality of emitters. The system requires information on the position of the receiver to determine emitters in the vicinity of the stationary receiver, the so called area of interest. The system may select the best emitter in case of a plurality of emitters within the area of interest by applying further selection criteria, e.g. a fast over a slower emitter, or an emitter already activated for other purposes over an emitter that is currently in a power saving mode.

Use cases 4 to 6 relate to one or more mobile receivers, which may be temporarily stationary or actually in transit. As shown in FIG. 3, two mobile receivers A6 and A7 in use case 5 cross ways in room R4. In order to determine their respective current and future areas of interest, the system needs a vector to determine the trajectory so as to select the current position and compute a prediction on the most likely future position. Exemplary use case 6 depicts two mobile receivers A8 and A9 moving in the same direction, and use case 4 shows a mobile receiver A4 transiting in the vicinity of fast Tx2 and Tx3 and slow L26 and L27 emitters. In such cases, the system can dynamically select the best emitter(s) at any time, which may be a suitable combination of a single or multiple emitters of any type (slow or fast).

Figure 4:
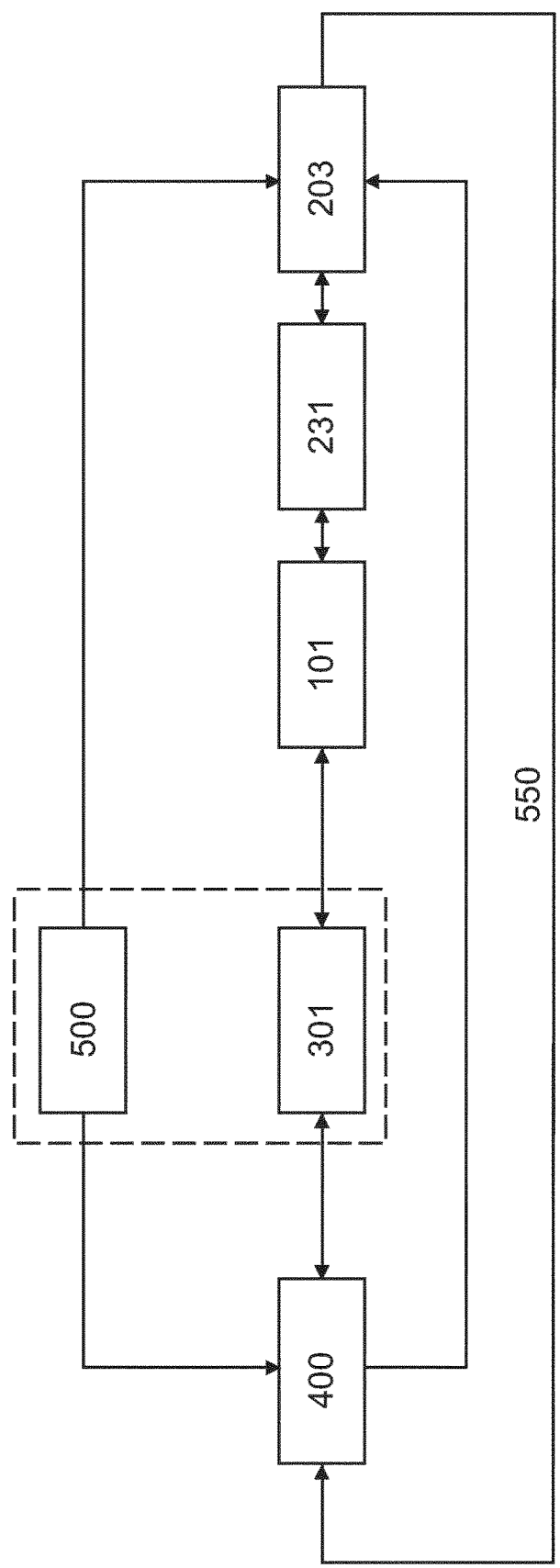
FIG. 4 shows a system diagram for a dynamic lighting data communication system.

FIG. 4 shows a system diagram for a dynamic lighting data communication system in accordance with a preferred embodiment of the present invention. As is apparent from FIG. 4, the position of the (mobile) receiver 400 may be observed by an external observation sensor 500 and notified to the SDL control system 203, but may alternatively be notified by the (mobile) receiver 400 itself. The system can compute an optimal configuration for emission of the data and program the network accordingly. The system may transmit a signal to the (mobile) receiver 400 providing information on how to find the data, either out-of-band via another backlink 550 or in-band using the light emissions, visible or invisible. The system may be set up as a uni-directional system, where the system uses light emissions to emit data from the computer network to a (mobile) receiver. Alternatively, the system may be set up as bi-directional hybrid system, where the system uses light emissions to emit data from the computer network to a (mobile) receiver, and the (mobile) receiver implements another link to signal some information back to the system. Another alternative would be a bi-directional system where the system uses light emissions to emit data from the computer network to a (mobile) receiver and the (mobile) receiver can also use light emissions to emit data back to the system.

In a preferred embodiment the mechanism to determine the locations of emitters within a lighting control system is implemented using a data structure for a slow and fast emitter pool, recording a unique identification of each emitter with its corresponding unique (relative) position. The system may use a well-known method to make all emitters known to the network, so they can be registered into said emitter pool(s). An example is e.g. service discovery. Alternatively, this data could be entered manually or via a separate list.

It is required that the system knows the location of each emitter in the building plan, so as to immediately identify and select the correct emitter for any location where the (mobile) receiver may be(come) present. Multiple mechanisms are known to derive the location. By way of an example, the location could be recorded during commissioning or have been entered manually.

Alternatively, the emitter ID can be detected in real time. A light emitter may, for example, transmit an ID with light. To detect lights from neighbouring emitters in real time, a separate detector on the emitter is used and a relative coordinate is derived via triangulation.

The system builds a relative coordinate system with information on all components in the system, including the (mobile) receivers. The mechanism can collect coordinates in multiple overlays. This simplifies matching the needs of the (mobile) receiver to the capabilities of suitable emitters. Optionally, areas that will never be used, like for example the location of furniture, may be determined and taken into account for effective traffic channeling. Additionally, the position of the data forwarding components within the communication network, such as e.g. data switches and/or data routers, may optionally be determined.

Having determined the fix positions of the components on the network side, the mechanism to determine the position and moving direction of a mobile receiver will be described. The position and a direction of movement AΩ (i.e. a vector with e.g. current position, speed and direction) of a mobile receiver can be determined and provided to the system, e.g. by exploiting externally gathered sensor data or internal data which provide position information and/or changes regarding the position of the mobile receiver, e.g. via a still camera sensor, imaging sensor, passive radar sensor, IR sensor. FIG. 5a shows the movement of mobile receiver A4 at different time instants A4', A4" and A4'". There may be alternative approaches to determine the location and/or speed of the receiver as illustrated in FIG. 5b-d which exemplary shows different approaches to determine the position and direction of mobile receiver A4' at a time instant t2 as depicted in FIG. 5a.

To derive a stationary position within a room given the underlying coordinates U1-U6, a signal from a single sensor S6 signal and triangulation may be sufficient as depicted in FIG. 5b. To derive a vector (i.e. current position, speed and direction) multiple sensors may be required. One method is to determine the position P2 of the mobile receiver using an external sensor S1-S5 and F1-F2 as depicted in FIG. 5c. An alternative method is to use the lighting system to observe differences in time of flight (e.g. Doppler) from unique codes send from a plurality of light emitters S1-S5 and F1-F2 to the mobile receiver at position P2 as depicted in FIG. 5d. Another alternative is to let the mobile receiver detect its position and report to the system. This could be done via detection of data transmitted by the lighting system (e.g. Coded Light) or by using local sensors (e.g. accelerometers, magnetometers) in the device of the mobile receiver. Sensor fusion may be applied to combine different sensor signals to enhance the quality of the position and vector of the mobile receiver.

Upon determination of a current position and based on information regarding speed and direction of a movement, a future position may be predicted and the system may proactively perform a handover with respect to the suitable emitters used for data communication to enable efficient use of the emitters within an area of interest and keep all other emitters free to use their full bandwidth for other transmissions.

Figure 6:
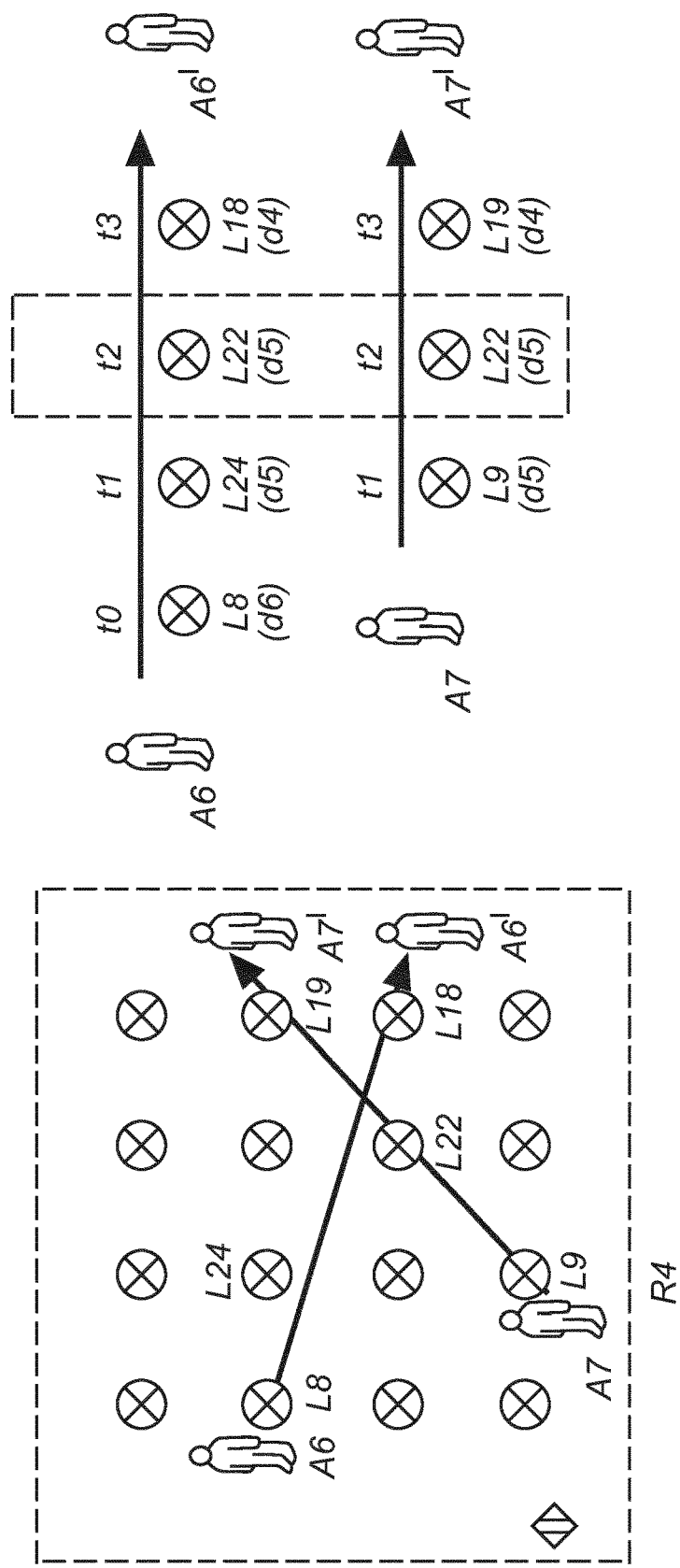
FIG. 6 shows example use case 5 with two mobile receivers crossing path as depicted in Room 4 of FIG. 3, FIGS. 7a-d show example use case 5 of FIG. 6 over time.

FIG. 6 shows use case 4 with two mobile receivers A6 and A7 in room R4 at the same time. In a preferred embodiment the maximum bandwidth is offered to each of them as long as they are positioned under different emitters L8, L18 and L9 and L19 and L24, respectively. At time t2 both mobile receivers A6 and A7 are positioned closest to emitter L22. The system will offer a multiplexed data-stream for both to receive and information how each individual mobile receiver can retrieve its data from the multiplexed data stream.

In its simplest form the system may just select every available emitter that is geographically located in the vicinity of the current position as an optional future candidate emitter. In a more advanced embodiment, a configurable area of interest is computed, based on speed and direction, derived e.g. from sensor data and/or preceding position information, to create a list with emitters that are located within an area of interest along the predicted route. This computation enables to predict the most likely next emitter for a moving mobile receiver. Notably in addition to the most likely next emitter, when network load and interference allows, it may also be possible to simulcast the same message from multiple emitters in the direction of the next emitter so as to improve the likelihood of providing proper coverage for roaming users.

Knowledge of a direction of motion of multiple end-users may further be used to coordinate traffic flow in the system.

The latter may in particular be relevant when multiple end-users are making use of similar channels and are moving towards one another; i.e. when the load resulting from the presence of both users in a spatial region might overload a particular emitter. By assigning different nodes to different users, or by moving one of the end-users to another physical channel; conflicts and interference may be further reduced.

An example of predictions over time, with vicinity computation, for example on the receiver's motion vector (i.e. speed and direction), is shown in FIGS. 7a-d, which also refers to use case 4.

At time t=0, mobile receiver A7 has been stationary for a predetermined amount of time. Accordingly the area of interest is determined as a circular area around the mobile receiver since no preferred direction of movement can be predicted. The system will only offer data for A7 at emitter L9, and identifies emitters L10, L25 and L15 as possible next emitter candidates. When the mobile receiver starts moving, the system will determine speed and direction of said mobile receiver and adapt the area of interest accordingly, determine the emitters within this area and redirect the data to one or more of the emitters within the area of interest. The main benefit is that the system can resort to emitting only the most essential information due to the lowered bandwidth caused by multiplexing being applied only on specific locations.

Figure 7A:
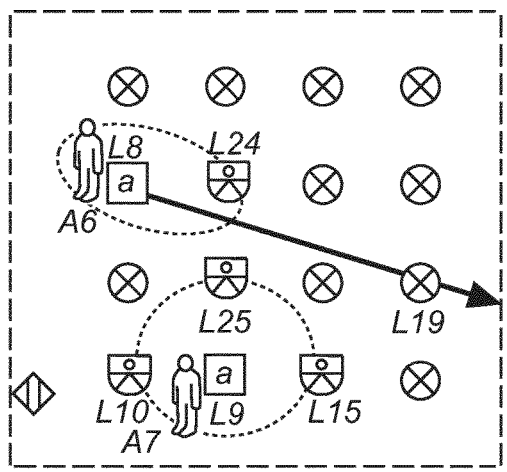

Further to FIG. 7a, at time t=0, the system detects that mobile receiver A6 is moving from a position closest to active emitter L8 in the direction of L19. The system recomputes the area of interest for mobile receiver A6 and selects L24 as the first emitter on route to L19 as a very likely candidate to be used when the movement continues in said direction. At the specific time t=0, the system may inject the data for A6 only on the location L8, but may already prepare to redirect the data injection to L24.

Figure 7B:
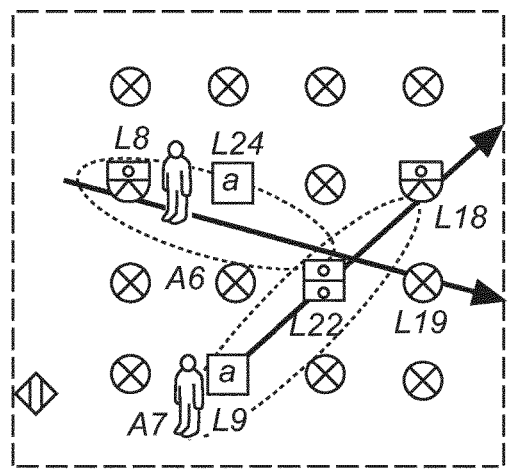

At time t=1, the mobile receiver A6 continued movement in the direction towards L24 as depicted in FIG. 7b. The system redirects data injection for A6 from L8 to L24. Using the management system in accordance with the preferred embodiment, redirecting data injection would include defining and programming new data path(s) to L24 while also actively cancelling the data path definitions to L8. The system recomputes and selects L22 as the next emitter on route to L19 as a very likely candidate to be used when the movement continues in said direction. As a fall-back, the system identifies L8 as likely candidate on the same axis of movement. Likewise, on time t=1 the mobile receiver A7 has started movement in the direction of say L18. The system recomputes the area of interest for mobile receiver A7 and selects L22 as the first emitter on route to L18 as a very likely candidate to be used when the movement continues in said direction. At the specific time t=1, the system will inject the data for A7 only on active emitter L9, but prepares to redirect the data injection to L22. The system already knows that L22 is selected twice as emitter candidate by two mobile receivers A6 and A7.

Figure 7C:
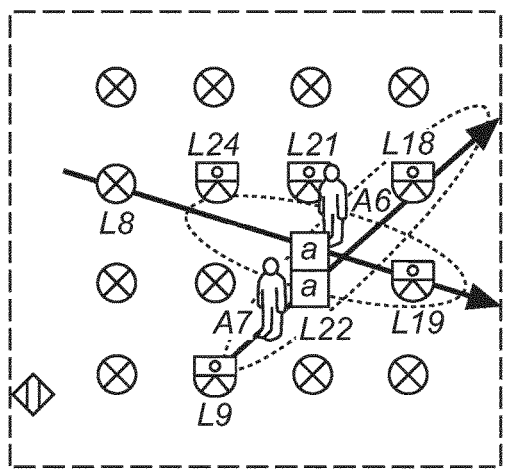

At time t=2 shown in FIG. 7c, mobile receivers A6 and A7 cross paths and are temporarily both located closest to emitter L22. The system will inject the data for both mobile receivers using emitter L22 for example with a multiplexing technology such as for example but not limited to (one of the many flavours of) OFDM. Alternatively, the system may avoid multiplexing if another emitter would be in reach for either A6 or A7. Since the movements of both A6 as well as A7 continue, the system recomputes the respective areas of interest and selects respective new candidate emitter options. The system consequently defines appropriate programming as well as cancellation of the respective data paths.

Figure 7D:
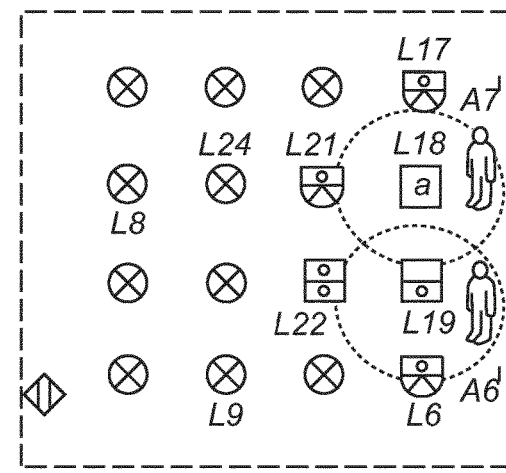

At time t=3 shown in FIG. 7d, both mobile receiver A6 and A7 stopped moving. The system uses active emitter L18 to inject the data for A7 and the active emitter L19 to inject the data for A6. The system recomputes the area of interest and selects new candidate emitters options located in a circular area around each receiving actor. The system consequently defines appropriate programming as well as cancellation of the respective data paths.

Figure 8:
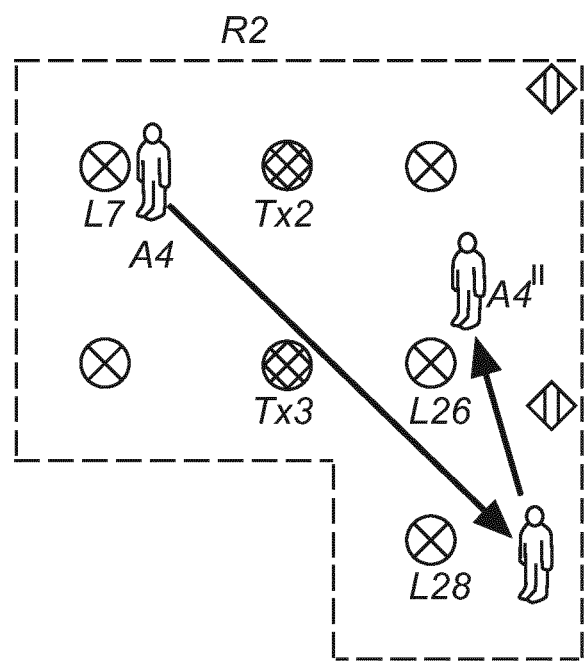
FIG. 8 shows exemplary use case 4 as depicted in Room 2 of FIG. 3.
Figure 9A:
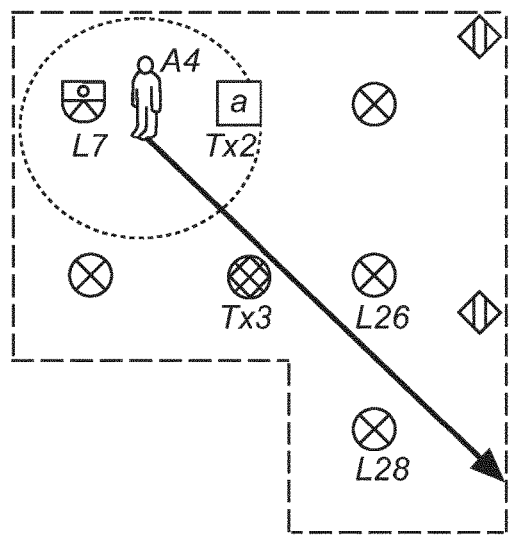
FIG. 9 shows the example use case 4 of FIG. 8 over time.
Figure 9B:
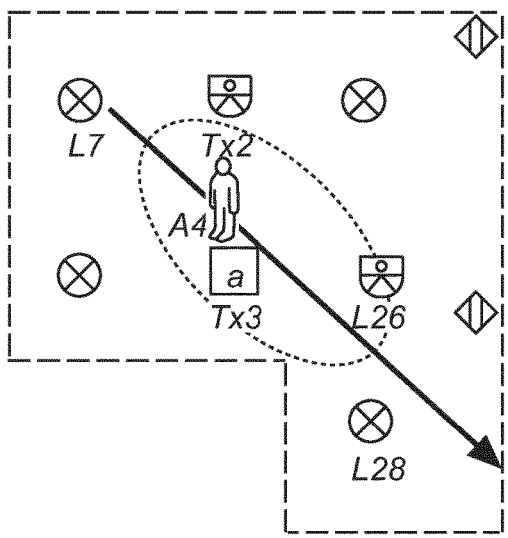
Figure 9C:
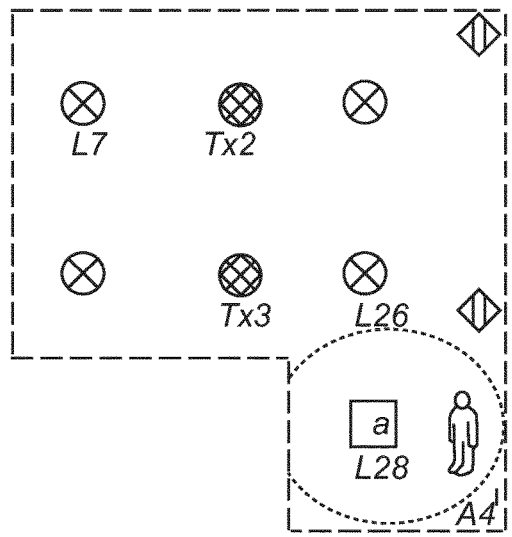
Figure 9D:
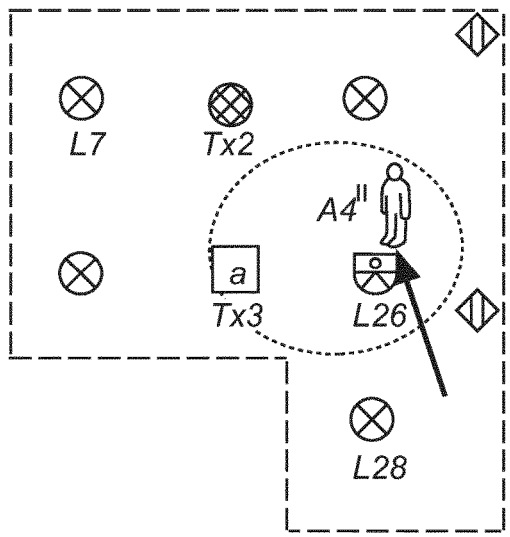

The system can use additional criteria to select one particular emitter within an area of interest. One example is indicated in FIG. 8 where both fast emitters Tx2 and Tx3 and slow emitters L7, L26 and L28 are installed in the same area of a building. The system is programmed to prefer the fast emitter over the slower emitter, although the slow emitter may be closer to the mobile receiver.

FIG. 9 illustrates the respective single selection steps of the route taken by the person carrying the mobile receiver A4 in FIG. 8. At the beginning at t=0, as shown in FIG. 9a, the mobile receiver A4 is located between slow emitter L7 and fast emitter Tx2. In the area of interest closest to A4 is slow emitter L7. However, also fast emitter Tx2 lies within the area of interest. Since fast emitters are to be preferred over slow emitters, Tx2 is selected for data injection. Upon moving towards the lower right corner, the area of interest is calculated as depicted in FIG. 9b at t=1 and fast emitter Tx3 is selected over slow emitter L26 for data injection. When positioned in the bottom right corner as depicted in FIG. 9c at t=2, the area of interest only covers a single slow emitter. In this case, the slow emitter is selected. However, at t=3 as depicted in FIG. 9d the closest emitter is slow emitter 26. Nonetheless Tx3 is selected over L26, although being at the outermost area of the area of interest, since T3x provides fast data emission.

Figure 10A:
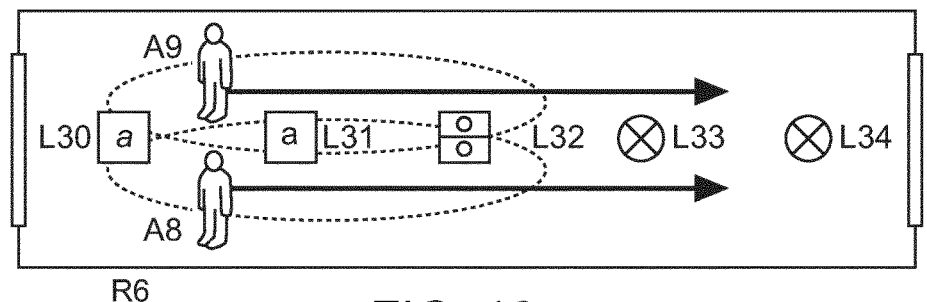
FIGS. 10a and 10b show exemplary use case 6 as depicted in room R6 of FIG. 3.
Figure 10B:
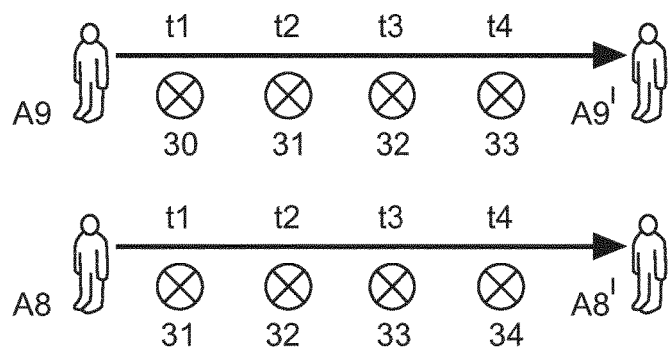

FIGS. 10a-b illustrate another selection criteria which accounts for multiple mobile receivers. Two mobile receivers A8 and A9 are carried along a corridor in the same direction. The area of interest is stretched in forward direction for both mobile receivers as indicated in FIG. 10a. Wherein the system assigns the emitter ahead of the common position of A8 and A9 on the predicted route to receiver A8, A9 is assigned the receiver behind the common position of A8 and A9. As shown in FIG. 10b the assignment of emitters to A9 is effectively delayed with respect to A8 to avoid A8 and A9 sharing the same emitter, e.g. multiplexing and thus only having parts of the bandwidth for each mobile receiver. Alternative emitter assignment may be chosen to avoid concurrent usage of the same emitters. In dense networks an interleaved emitter assignment could be applied.

Figure 11:
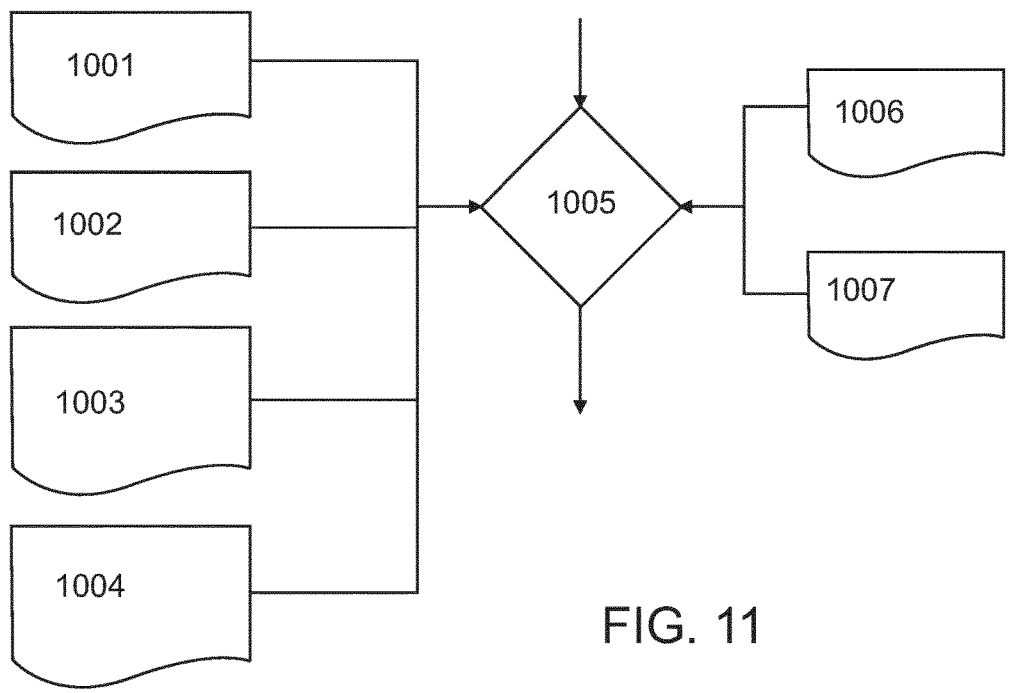
FIG. 11 shows a predictive algorithm.

The algorithm to select a suitable emitter is thus based on multiple criteria. As shown in FIG. 11 the system requires the relative positions of the emitters as input and may optionally collect the coordinates of available fast (1001) and slow (1002) emitters, check if the respective emitters (i.e. light actuators) are actually usable as stipulated by their application scenes from the application plan (1003), and compare the estimated position of the mobile receivers (1004) with suitable emitters, so as to classify multiple possible candidates and select (1005) a match according to predetermined criteria. An example of such a criterion is for example a preference (1006) of using a fast emitter over a slow emitter. However, other criteria distinguishing between emitters is may be used instead or in addition, eventually providing proper weighting.

The system may define a configurable risk appetite (1007) to accept higher risk when making emitter selections. One example is the form and the surface area covered by the area of interest as well as the number of emitters within the area of interest the data is actually injected to, which may only be a single emitter or in case of a certain prediction uncertainty two or more emitters within the area of interest.

Another example is that the system, while trying to offer exclusive usage of an emitter and to prevent that a suitable emitter is selected for simultaneous usage of multiple mobile receivers, knowingly selects different emitters, exclusive to each mobile receivers. This could increase the change of sub optimal reception of signals from the emitter. When detected, this may be fed back to the system to dynamically adapt the risk appetite.

Figure 12:
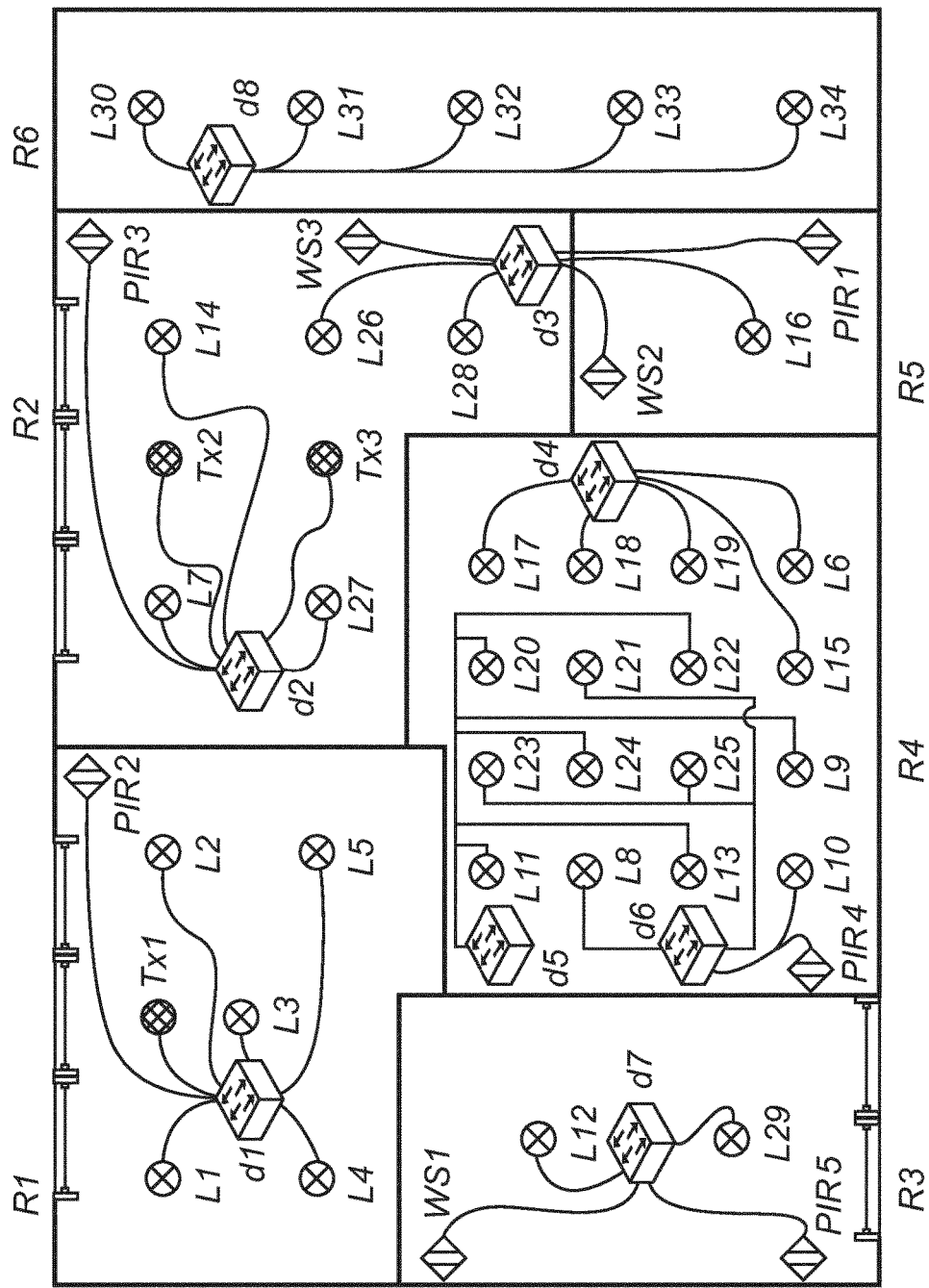
FIG. 12 shows an assignment of the emitter pool to respective data forwarding devices of the underlying communication network.

As pointed out above, not only the final emitter to emit the data has to be selected, also the path through the network towards this emitter has to be determined by the system. In a preferred embodiment a data structure is implemented that collects information about which data forwarding device d1-d8 (i.e. a data switch or router) the sensors and actuators within an application control network are connected to as illustrated in FIG. 12. The emitters, sensors or actuators can be located in another area than the data forwarding device they are connected to. A state of the art software defined network system is able to find all communication paths to the data forwarding device devices and the end nodes connected thereto, dynamically at any time. Usually this procedure is referred to as route discovery. In the preferred embodiment an software defined application system is added to provide context to the end nodes, being sensors or actuators that have a certain role and interaction in an application (e.g. lighting)-scene. For instance, depending on an observed occupancy of a particular room to particular times of the day, week, month or year, illumination lighting may be provided by a predetermined number of lights. For instance, while during the day, full illumination may be required, a minimum lighting scenario may be applied during night, wherein only a minimal set of lighting actuators need to be powered up while the rest may be set to a power saving mode. In addition also the data forwarding devices connecting the end nodes set to a power saving mode may be switched to a power saving mode. Both may be reactivated in accordance with another application scene managed by the software defined application system which maintains an overview over the sensors and actuators are available at particular timeslots. The software defined application system will consult the software defined network system to determine which communication paths are available within the network between the participants in a particular application scenes.

Figure 13:
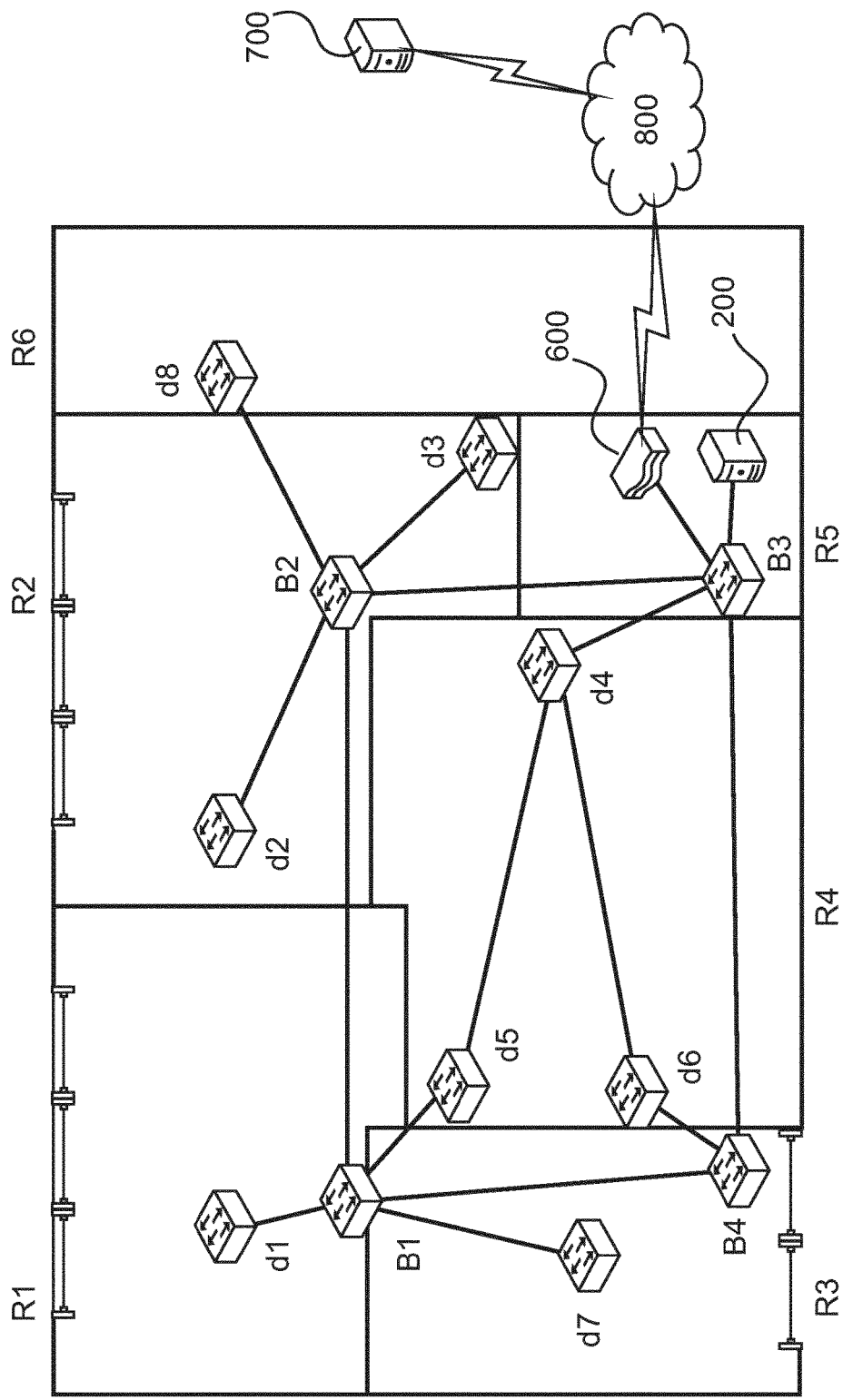
FIG. 13 shows a communication structure of the underlying communication network.

FIG. 13 illustrated an exemplary underlying network topology serving the application system as depicted in FIG. 12. The data switches d1-d8 are connected to routing devices B1-B4, providing a plurality of data paths through the communication network. The control system 200 may program the respective data forwarding devices to pass on the data from a source node 600 within the network system to the emitter selected for data transmission to the mobile receiver via a selected path within the network topology. The source node 600 may be communicatively coupled to a remote host 700 via the internet or an intranet 800. Hence, in a preferred embodiment dynamic (re)programming of the network's data paths to the selected emitter (i.e. slow or fast emitter) is used. Lighting devices with a dual function to perform functional or ambient illumination as well as data communication transmission may be switched off as stipulated by a lighting plan. In those cases the emitter pool with available emitters is dynamically updated and the system computes the available network paths to the receiver(s).

The system will implement a smooth change over between different emitters. The emitters can be slow or fast emitters and are preferably connected to the software defined application system via a software defined network system, so as to dynamically define communication path definitions to the correct emitters and cancel eventually existing path definitions to emitters that are not used anymore. Usually, data path definitions in a software defined network system are typically of timed duration, and this works fine for end nodes connected via path cables to RJ45 data terminals. In the preferred embodiment the software defined network system additionally has to deal with roving end nodes moving at non constant speeds, showing up at undetermined intervals at different emitters used to support said end node. Duration of data path definitions will therefore be hard to predict. Thus an active management of existing data paths is required. The moment the system determines to start using a different emitter at another position, a data path definition to the new emitter must be programmed and the data path definition to the emitter at the old position must be actively cancelled. Wherein the described example was given with respect to a software defined network system, it shall be understood that any other network management system with similar capability to configure data paths dynamically may be used instead.

Data communication with or from the (mobile) receivers and the application control network may be performed using a variety of existing technologies to enhance data communication, such as for example multiplexing (e.g. OFDM) or special modulation techniques (e.g. VPPM, CSK, OOK).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

Procedures like determining positions, computing an area of interest, identifying a subgroup and programming data paths, et cetera performed by one or several units or devices can be performed by any other number of units or devices. These procedures and/or the control of the application control system in accordance with the method for directing traffic can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. Method for directing communication traffic to and from a communication unit within an application control system, wherein the application control system comprises a plurality of application control components, the application control components being capable of transmitting data to the communication unit using light waves, the method comprising:
  determining the positions of the application control components within the application control system;
  determining respective first and second position information of a first communication unit within the application control system at subsequent instants;
  computing an area of interest for the first communication unit based on changes between at least the first and second position information;
  identifying a first subgroup of one or more application control components from the plurality of application control components located within the area of interest of the first communication unit; and
  programming data paths through the application control system to communicate data with the communication unit using the identified subgroup of application control components.

2. Method according to claim 1, wherein the plurality of application control components comprise a first application control component and a second application control component having a different characteristic, preferably said characteristic is any one or more from the set of maximum bit rate, throughput, transmission delay, availability, latency, error rates, and support for prioritization; and
  wherein programming data paths through the application control system to communicate data with the first communication unit using the identified subgroup of application control components takes into account a pre-determined preference when selecting at least one of the first application control component and the second application control component if both are located within the determined area of interest.

3. Method according to claim 2, wherein the application control system is a lighting control system and the second application control component is an illumination lighting component.

4. Method according to claim 3, wherein programming data paths through the application control system to communicate data with the first communication unit using the identified subgroup of application control components comprises temporarily assigning a light channel to the first communication unit.

5. Method according to claim 1, further comprising:
  determining the availability of the plurality of application control components in accordance with an application plan, and wherein identifying a first subgroup of one or more application control components from the plurality of application control components located within the area of interest of the first communication unit is restricted to the plurality of application control components available at a respective instant of time in accordance with the application plan.

6. Method according to claim 1, further comprising:
  determining third position information of a second communication unit within the application control system at a first instant; and
  compute an area of interest for the second communication unit based on at least the third position information;
  identify a second subgroup of application control components from the plurality of application control components located within the area of interest of the second communication unit; and
  wherein programming data paths through the application control system to communicate data with the first and second communication unit using the identified subgroups of application control components comprises:
    (i) multiplexing data transmissions for the first and second communication unit if the first and second subgroups of application control components overlap, or
    (ii) program data paths through the application control system to communicate data with the first and second communication unit using mutually exclusive application control components.

7. A computer program executable in a processing unit, the computer program comprising program code means for causing the processing unit to carry out a method as defined in claim 1, when the computer program is executed in the processing unit.

8. Control system for directing communication traffic to and from a communication unit within an application control system, wherein the application control system comprises a plurality of application control components, the application control components being capable of transmitting data to the communication unit using light waves, comprising:
  a first interface for receiving position information of each of the plurality of application control components within the application control system;
  a processing unit configured to:
  determine respective first and second position information of a first communication unit within the application control system at subsequent instants;
    compute an area of interest for the first communication unit based on changes between at least the first and second position information;
    identify a first subgroup of one or more application control components from the plurality of application control components located within the area of interest of the first communication unit; and
  an interface for programming data paths through the application control system to communicate data with the first communication unit using the identified subgroup of application control components.

9. Control system according to claim 8, wherein the plurality of application control components comprises a first application control component and a second application control component having a different characteristic, preferably said characteristic is any one or more from the set of maximum bit rate, throughput, transmission delay, availability, latency, error rates, and support for prioritization and
  wherein the processing unit is further adapted to program data paths through the application control system to communicate data with the first communication unit using the identified subgroup of application control components by taking into account a pre-determined preference when selecting at least one of the first application control component and the second application control component if both are located within the determined area of interest.

10. Control system according to claim 8, further comprising an application plan defining application scenes for the second application control component and wherein the processing unit is further adapted to program data paths through the application control system to communicate data based on the availability of the second application control components according to the respective application scenes.

11. Control system according to claim 8, wherein the processing unit is further adapted to compute data paths through the application control system to communicate data with the first communication unit using the identified subgroup of application control components by temporarily assigning a light channel to the first communication unit.

12. Control system according to claim 8, further comprising an application plan, wherein the processing unit is configured to identify a first subgroup of one or more application control components from the plurality of application control components located within the area of interest of the first communication unit from the plurality of application control components available at a respective instant of time in accordance with the application plan.

13. Control system according to claim 8, wherein the processing unit is further adapted to:
- determine third position information of a second communication unit within the application control system at a first instant; and
- compute an area of interest for the second communication unit based on at least the third position information;
- identify a second subgroup of application control components from the plurality of application control components located within the area of interest of the second communication unit; and
- wherein the processing unit is configured to program data paths through the application control system to communicate data with the first and second communication unit using the identified subgroups of application control components by
- (i) multiplexing data transmissions for the first and second communication unit if the first and second subgroups of application control components overlap, or
- (ii) program data paths through the application control system to communicate data with the first and second communication unit using mutually exclusive application control components.

* * * * *